US012614095B2

(12) United States Patent (10) Patent No.: US 12,614,095 B2
Lyons et al. (45) Date of Patent: Apr. 28, 2026

(54) SYSTEM AND METHOD FOR ACTIVITY CLASSIFICATION

(71) Applicant: Cypress Semiconductor Corporation, San Jose, CA (US)

(72) Inventors: Niall Lyons, San Jose, CA (US); Avik Santra, San Jose, CA (US); Ashutosh Pandey, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 937 days.

(21) Appl. No.: 17/729,899

(22) Filed: Apr. 26, 2022

(65) Prior Publication Data

US 2023/0011394 A1 Jan. 12, 2023

Related U.S. Application Data

(60) Provisional application No. 63/220,901, filed on Jul. 12, 2021.

(51) Int. Cl.
*G06N 7/01* (2023.01)
*G01P 13/00* (2006.01)
*G06F 3/01* (2006.01)
*G06N 20/00* (2019.01)
*G06N 3/047* (2023.01)

(52) U.S. Cl.
CPC .............. *G06N 7/01* (2023.01); *G01P 13/00* (2013.01); *G06F 3/011* (2013.01); *G06N 20/00* (2019.01); *G06N 3/047* (2023.01)

(58) Field of Classification Search
CPC ...................................................... G06N 7/01
USPC ........................................ 706/12; 705/26.41
See application file for complete search history.

(56) References Cited

U.S. PATENT DOCUMENTS

| 11,199,837 B2 | 12/2021 | Cella | |
| 11,720,942 B1 * | 8/2023 | Bazzani | G06Q 30/0613 |
| | | | 705/26.41 |
| 11,838,036 B2 | 12/2023 | Cella | |
| 2018/0342322 A1 * | 11/2018 | Apte | G16H 20/00 |
| 2019/0019575 A1 * | 1/2019 | Apte | G16H 50/70 |
| 2020/0152330 A1 * | 5/2020 | Anushiravani | G16H 70/60 |
| 2020/0372350 A1 * | 11/2020 | Cho | G06N 3/045 |

(Continued)

FOREIGN PATENT DOCUMENTS

| CN | 114008551 A | 2/2022 | |
| WO | WO-2018094376 A1 * | 5/2018 | A61B 5/4836 |
| WO | WO-2022060578 A1 * | 3/2022 | G06F 21/32 |

OTHER PUBLICATIONS

Weihua Chen. et al., "Beyond triplet loss: a deep quadruplet network for person re-identification", https://arxiv.org/abs/1704.01719.

(Continued)

*Primary Examiner* — Ruay Ho

(57) ABSTRACT

One or more computing devices, systems, and/or methods are provided. In an example, a method comprises receiving, by a device, incoming motion data from a motion sensor, generating, by the device, an incoming embedding vector based on the incoming motion data, generating, by the device, a predicted embedding vector based on the incoming embedding vector, assigning, by the device, an activity classification based on the predicted embedding vector, and modifying an operating parameter of the device based on the activity classification.

18 Claims, 5 Drawing Sheets

(56) References Cited

U.S. PATENT DOCUMENTS

| | | | |
|---|---|---|---|
| 2020/0388287 A1* | 12/2020 | Anushiravani | G16H 20/10 |
| 2021/0012770 A1* | 1/2021 | Choudhary | G06F 3/017 |
| 2021/0116540 A1 | 4/2021 | Santra et al. | |
| 2022/0075822 A1* | 3/2022 | Lumezanu | G06F 16/906 |
| 2022/0268229 A1* | 8/2022 | Timofejevs | F02P 17/12 |
| 2022/0280072 A1* | 9/2022 | Timofejevs | G06F 18/24147 |

OTHER PUBLICATIONS

P. Vaishnav and A. Santra, "Continuous Human Activity Classification With Unscented Kalman Filter Tracking Using FMCW Radar," in IEEE Sensors Letters, vol. 4, No. 5, pp. 1-4, May 2020, Art No. 7001704, doi: 10.1109/LSENS.2020.2991367.
A. Dubey, A. Santra, J. Fuchs, M. Lübke, R. Weigel and F. Lurz, "A Bayesian Framework for Integrated Deep Metric Learning and Tracking of Vulnerable Road Users Using Automotive Radars," in IEEE Access, vol. 9, pp. 68758-68777, 2021, doi: 10.1109/ACCESS. 2021.3077690.
Taiwan Office Action from TW 111121675 mailed Dec. 29, 2025 (8 pages).

* cited by examiner

300

302 — RECEIVE TRAINING MOTION DATA SET

304 — GENERATE QUADRUPLET MOTION SEQUENCES

118 — EMBEDDING MODEL

306 — TRAIN EMBEDDING MODEL BASED ON QUADRUPLET MOTION SEQUENCES

124 — ACTIVITY CLASSIFICATION MODEL

308 — TRAIN ACTIVITY CLASSIFICATION MODEL USING LABELED EMBEDDING VECTOR SEQUENCES

400 —

Receive incoming motion data — 402

Generate incoming embedding vector based on incoming motion data — 404

Generate predicted embedding vector based on incoming embedding vector — 406

Assign activity classification to predicted embedding vector — 408

Modify operating parameter of device based on activity classification — 410

500

502

NON-TRANSITORY MEMORY DEVICE

504

001101 0110001 011000 0111111 0111111 0000000
00000 0111011 011110 011001 0111011 0000000

READING

506

PROCESSOR-
EXECUTABLE
INSTRUCTIONS

508

DEVICE

510

READER

512

PROCESSOR

514

SYSTEM AND METHOD FOR ACTIVITY CLASSIFICATION

CROSS-REFERENCE TO RELATED APPLICATIONS

The present application claims the priority and benefit of U.S. patent applications Nos. 63/220,901 filed on Jul. 12, 2021, the contents all of which are incorporated by reference herein in their entirety.

BACKGROUND

Human activity classification involves detecting motion data using a device carried by an individual and determining an activity in which the user is engaged based on the motion data. Activity classifications may be used for device mode control, automation control, safety monitoring, or other applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a system is provided. The system comprises means for receiving incoming motion data from a motion sensor, means for generating an incoming embedding vector based on the incoming motion data, means for generating a predicted embedding vector based on the incoming embedding vector, means for assigning an activity classification based on the predicted embedding vector, and means for modifying an operating parameter of the device based on the activity classification.

In an embodiment of the techniques presented herein, a device is provided. The device comprises a motion sensor configured to generate incoming motion data, and a processor configured to execute instructions to facilitate performance of operations comprising generating an incoming embedding vector based on the incoming motion data, generating a predicted embedding vector based on the incoming embedding vector, assigning an activity classification based on the predicted embedding vector, and modifying an operating parameter of the device based on the activity classification.

In an embodiment of the techniques presented herein, the operations comprise filtering the incoming motion data to generate filtered motion data, sampling the filtered motion data into a window of predetermined length, and generating the incoming embedding vector based on the window.

In an embodiment of the techniques presented herein, a non-transitory computer-readable medium is provided. The non-transitory computer-readable medium stores instructions that when executed facilitate performance of operations comprising receiving incoming motion data from a motion sensor, generating an incoming embedding vector based on the incoming motion data, generating a predicted embedding vector based on the incoming embedding vector, assigning an activity classification based on the predicted embedding vector, and modifying an operating parameter of a device based on the activity classification.

In an embodiment of the techniques presented herein, a system is provided. The system comprises means for receiving incoming motion data from a motion sensor, means for generating an incoming embedding vector based on the incoming motion data, means for generating a predicted embedding vector based on the incoming embedding vector, means for assigning an activity classification based on the predicted embedding vector, and means for modifying an operating parameter of the device based on the activity classification.

In an embodiment of the techniques presented herein, a device is provided. The device comprises a motion sensor configured to generate incoming motion data, and a processor configured to execute instructions to facilitate performance of operations comprising generating an incoming embedding vector based on the incoming motion data, generating a predicted embedding vector based on the incoming embedding vector, assigning an activity classification based on the predicted embedding vector, and modifying an operating parameter of the device based on the activity classification.

In an embodiment of the techniques presented herein, the operations comprise filtering the incoming motion data to generate filtered motion data, sampling the filtered motion data into a window of predetermined length, and generating the incoming embedding vector based on the window.

In an embodiment of the techniques presented herein, a non-transitory computer-readable medium is provided. The non-transitory computer-readable medium stores instructions that when executed facilitate performance of operations comprising receiving incoming motion data from a motion sensor, generating an incoming embedding vector based on the incoming motion data, generating a predicted embedding vector based on the incoming embedding vector, assigning an activity classification based on the predicted embedding vector, and modifying an operating parameter of a device based on the activity classification.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
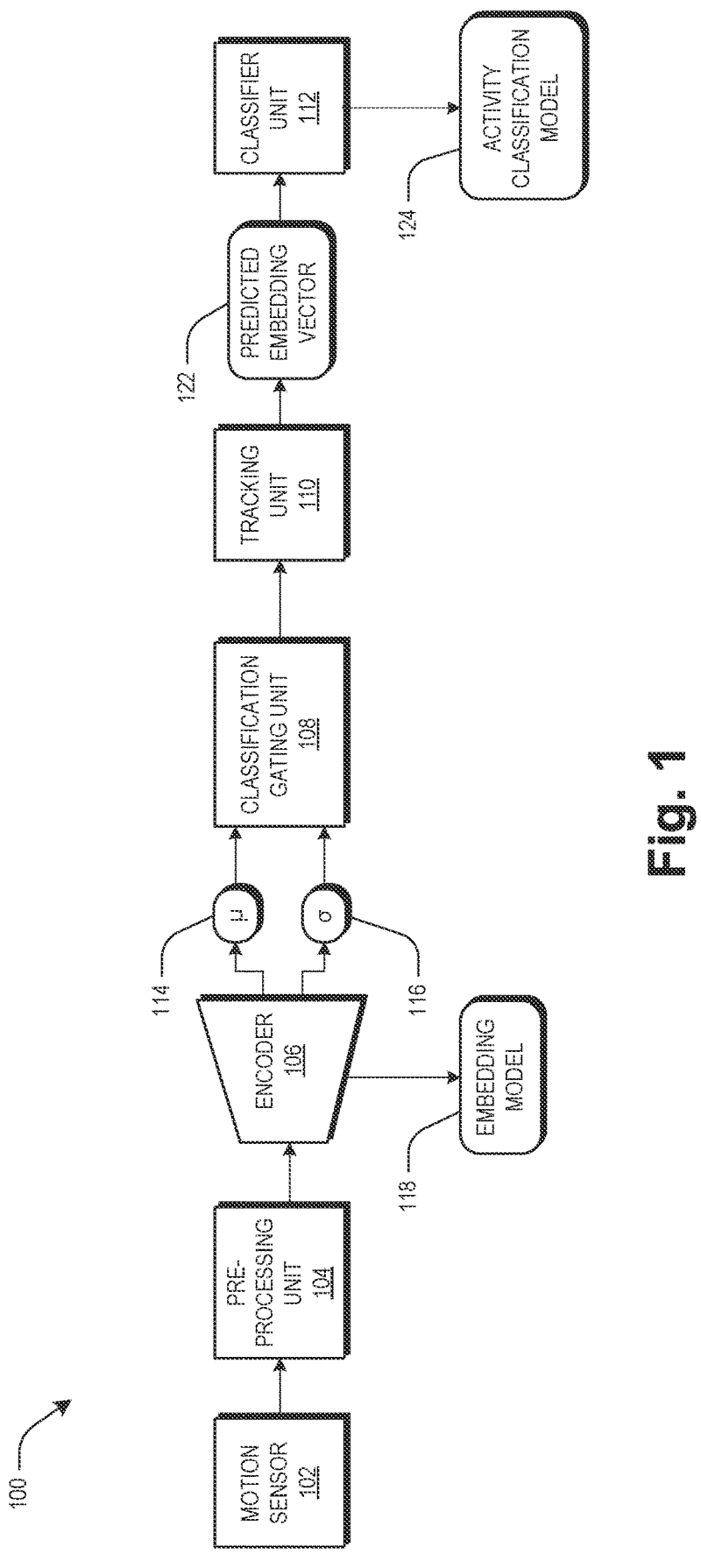
FIG. 1 is a diagram illustrating an example system for activity classification, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

Human activity classification finds applications in public health, personal surveillance, smart home, elderly monitoring, and human-machine interaction systems. Proactively sensing a user's activity can enable smart automatic control of devices to save energy demand in smart homes, such as heating, ventilation and air conditioning, and lighting. According to some embodiments, feature learning is employed to address open-set identification, wherein the activity performed need not belong to an activity previously encountered in the training set used for training a motion classifier. The classification accuracy is a measure of efficacy for a motion classification system. However, identifying or rejecting unknown activities is also useful.

In some embodiments, a Bayesian inference framework utilizing a Kalman filter to track and distinguish between different human activities is used. An embedding model using deep representation learning is trained using a quadruplet loss technique, wherein the embedding model learns to project the input sensor time series data into an embedding vector. Latent space data from similar activities are grouped together while dissimilar activities are far apart. In some embodiments, a quadruplet variational autoencoder (VAE) is used to provide the mean embedding vector and also its covariance. Using a reparameterization technique, a VAE decoder learns to reconstruct the denoised input examples across all the four encoders. The quadruplet loss is implemented on the mean embedding vector. Once trained, during inference, the embedding vector from the learned model is fed into a tracker, which uses a constant velocity to track the embedding vector over time. In some embodiments, classification gating is applied to handle spurious predictions from one off input data. A classifier unit, such as a linear classifier, operates on the tracked embedding vector for prediction and rejection of unknown classes using a distance thresholding technique. The Bayesian inference framework provides improved activity classification accuracy, closely-knit known activity clusters in latent space, and improved rejection of unknown activity classes. The activity classification system is capable of handling above sensor artifacts and environment uncertainties important for practical activity recognition solutions.

FIG. 1 is a diagram illustrating an activity classifier 100 in accordance with some embodiments. The activity classifier 100 comprises a motion sensor 102 configured to generate motion data, a pre-processing unit 104 configured to filter and sample the motion data, an encoder 106 configured to project the motion data into an embedding vector, a classification gating unit 108 configured to discard outlier embedding vectors, a tracking unit 110 configured to predict embedding vectors for future updates, and a classifier unit 112 configured to classify a motion based on the tracked embedding vector.

In some embodiments, the motion sensor 102 comprises an accelerometer, a gyroscope, a magnetometer, a compass, or some combination thereof. The motion sensor 102 generates raw motion data streams, such as 3-axis accelerometer data and 3-axis gyroscope data. In some embodiments, the pre-processing unit 104 filters noise from the raw motion data and samples the motion data into windows of predetermined length. For example, a Butterworth noise filter may be used, and the sampling windows may have lengths of about 1-3 seconds, such as 1.5 seconds.

In some embodiments, the encoder 106 generates a mean embedding vector 114 and a covariance embedding vector 116 from the motion data processed by the pre-processing unit 104 using an embedding model 118. The embedding model 118 is trained using a quadruplet loss learning technique to project the incoming motion data time series into embedding vectors. An embedding vector is a projection of the input data onto a vector representing the input. The embedding vector is a relatively low dimensional space into which you can translate high dimensional vectors using a learned embedding technique.

In some embodiments, during training of the embedding model 118, a set of four one-dimensional variational autoencoders (VAEs) are coupled together to generate four different motion data time series. A first motion data time series represents an anchor class, a second motion data time series represents another input example belonging to same class (positive class), a third motion data time series represents a sample from a first different class (negatives class), and a forth motion data time series represents a sample from a second different class (negative₂ class). Each VAE outputs a mean embedding vector and a covariance embedding vector based on the motion data time series it receives. A four coupled convolutional neural network decoder reconstructs the denoised motion data time series from the respective VAE.

A lightweight encoder-decoder architecture may comprise three one dimensional convolutional layers all including rectified linear unit (ReLu) activation with the addition of a max pooling layer after the initial convolutional layer. The convolutional layers act as feature extractors and provide abstract representations of the input motion data in feature maps, where each layer consists of 16, 8 and 4 filters respectively. A complementary one-dimensional decoder corresponding to the encoder is used for reconstructing the respective denoised time-series motion data.

A quadruplet loss may be defined by:

$$L_{quad} = \sum_{i,j,k}^{N} \left[ g(u_i, u_j)^2 - g(u_i, u_k)^2 + \alpha_1 \right]_+ +$$
$$\sum_{i,j,k,l}^{N} \left[ g(u_i, u_j)^2 - g(u_l, u_k)^2 + \alpha_2 \right]_+,$$

where $\alpha_1$ and $\alpha_2$ are the margins in two terms and g is the learned distance function by the classifier unit 112, $\underline{u}$ represents the six channel input vector, $g(\underline{u}_i, \underline{u}_j)^2$ represents the distance between the anchor and positive (AP) mean embeddings, $g(\underline{u}_i, \underline{u}_k)^2$ represents the distance between the anchor and negative₁ (AN) mean embeddings, $g(\underline{u}_i, \underline{u}_k)^2$ represents the distance between the $negative_1$ and $negative_2$ (NN) mean embeddings, and the subscripted "+" indicates a max(0,x) function.

In some embodiments, during training of the embedding model 118, hard samples are generated using a random strategy to generate a study batch including anchor, positive, $negative_1$, and $negative_2$ motion data time series. The motion data time series are sent to a learned metric network to generate the distances, AP, AN, and NN, which are sent to a quadruplet loss layer with total quadruplet loss defined by:

$$L_{tot} = L_{quad} + L_{KL} + L_{MSE}.$$

where $L_{KL}$ is the KL divergence loss at the latent vector to minimize its deviation from Gaussianity with 0 mean and unit variance, and $L_{MSE}$ is the mean squared error of reconstructing the denoised time series data at each of the decoders. The embedding model 118 is trained to minimize the loss function while projecting the motion data time series into an embedding vector.

After training, the encoder 106 uses the embedding model 118 to process incoming motion time series data to generate the mean embedding vector 114 and a covariance embedding vector 116 for classification.

In some embodiments, the classification gating unit 108 attempts to remove erroneous embedding vectors from influencing tracking unit 110 during the measurement update. The classification gating unit 108 may employ a Mahalanobis distance metric to calculate distance between the predicted state and the predicted embedding vector using:

$$d = (\underline{x}^P - \underline{z}) S^{-1} (\underline{x}^P \underline{z})^T,$$

where $\underline{x}^P$ and $\underline{z}$ are the predicted embedding vector via process update and the measurement embedding vector, respectively, while S is the innovation covariance matrix. The measurement embedding vector, $\underline{z}$, is associated with a particular state only if the Mahalanobis distance is less than a predefined threshold.

The tracking unit 110 generates a predicted embedding vector 122. In some embodiments, the tracking unit 110 is a Kalman filter. For a given Kalman state:

$$s = \begin{bmatrix} x1 \\ x2 \\ x3 \\ x4 \\ x5 \\ x6 \\ x7 \\ x8 \\ v1 \\ v2 \\ v3 \\ v4 \\ v5 \\ v6 \\ v7 \\ v8 \end{bmatrix}$$

the x components represent the current embedding vector and the v components represent the changes in the embedding vector. The tracking unit 110 generates the predicted embedding vector 122 using:

$$\begin{bmatrix} \underline{x}(k+1) \\ \underline{v}(k+1) \end{bmatrix} = \begin{bmatrix} I & dT*I \\ 0 & I \end{bmatrix} \begin{bmatrix} \underline{x}(k) \\ \underline{v}(k) \end{bmatrix}$$

where dT is the time interval between updates, I is the identity matrix, k is the frame, $\underline{x}(k)$ is the embedding vector, and $\underline{v}(k)$ is a vector representing changes in the embedding vector. In some embodiments, a constant embedding velocity model is used.

A measurement step is implemented using:

$$[\hat{\underline{z}}(k+1)] = \begin{bmatrix} I & 0 \\ 0 & 0 \end{bmatrix} \begin{bmatrix} \underline{x}(k) \\ \underline{v}(k) \end{bmatrix}$$

$$\text{Innovation} = y(k+1) = [z(k+1)] - [\hat{\underline{z}}(k+1)]$$

where z(k+1) is the predicted embedding vector at frame k+1.

For an initial state:

$$X_0, P_0$$

and a previous state:

$$X_{t-1}, P_{t-1}$$

The new predicted state is:

$$X_t^p = AX_{t-1} + Bu_t + w_t$$

$$P_t^p = AP_{t-1}A_t + Q_t$$

where p represents the matrix updated with a new prediction, w and Q are error terms, Matrix A (State Transition) updates X and P based on the time that has elapsed, and Matrix B applies acceleration (u) to provide values to update the position and velocity AX.

The Kalman Gain is calculated as:

$$K = \frac{P_t^p H^T}{HP_t^p H^T + R} \text{ and}$$

the measured data is:

$$Y_t = CY_t^m + Z^m$$

where the H matrix transforms the matrix format of P into the format desired for the K matrix, Y is a matric containing measurement data, m (the incoming embedding vector), C is a metric transform to allow summing with Z, and Z is the error term measurement.

The process and state matrix are updated by:

$$P_t = (I - KH)P_t^p$$

$$X_t = X_t^p + K[Y - HX_t^p].$$

The current state becomes the previous state:

$$X_t = X_{t-1}$$

$$P_t = P_{t-1}.$$

The updating repeats for subsequent embedding vectors.

The classifier unit 112 receives the predicted embedding vector 122 and uses an activity classification model 124 to classify the activity. In some embodiments, the classifier unit 112 is a linear classifier, such as a k-Nearest Neighbor (k-NN) classifier. The classifier unit 112 recognizes a known activity defined by the activity classification model 124, while rejecting unknown activities using a thresholding technique to reduce false alarms.

Figure 2:
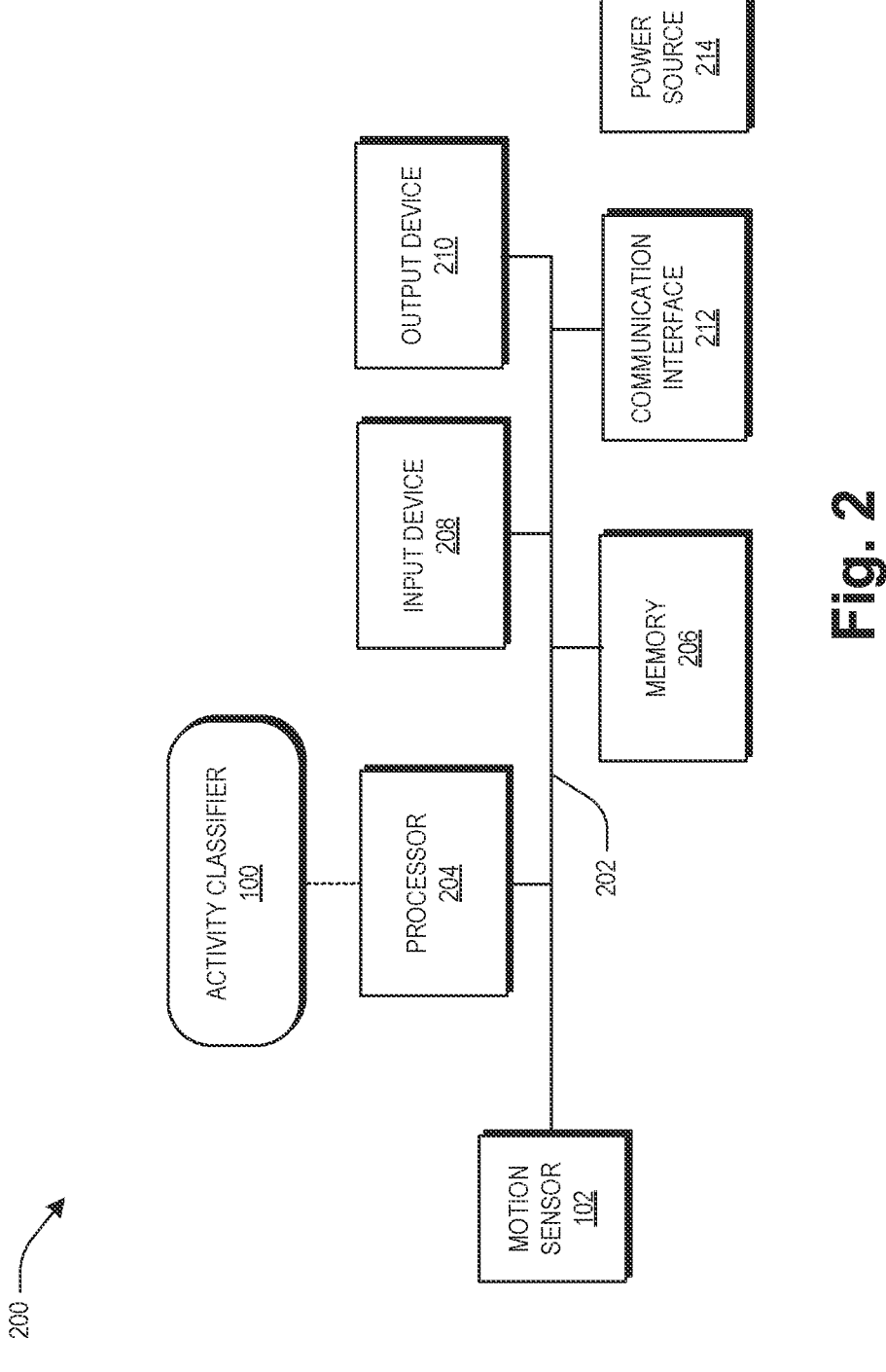
FIG. 2 is a diagram of a processing unit, in accordance with some embodiments.

FIG. 2 is a diagram of a device 200 for implementing the activity classifier 100, in accordance with some embodiments. In some embodiments, the device 200 comprises a bus 202, a processor 204, a memory 206 that stores software instructions or operations, an input device 208, an output device 210, a communication interface 212, and a power source 214, such as a battery. The processor 204 receives data from the motion sensor 102 and implements a software application that implements the activity classifier 100. The device 200 may include fewer components, additional components, different components, and/or a different arrangement of components than those illustrated in FIG. 2.

According to some embodiments, the bus 202 includes a path that permits communication among the components of the device 200. For example, the bus 202 may include a system bus, an address bus, a data bus, and/or a control bus. The bus 202 may also include bus drivers, bus arbiters, bus interfaces, clocks, and so forth. The processor 204 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 204 may be implemented as hardware (e.g., a microprocessor, etc.), a combination of hardware and software (e.g., a SoC, an ASIC, etc.), may include one or multiple memories (e.g., cache, etc.), etc.

In some embodiments, the processor 204 controls the overall operation or a portion of the operation(s) performed by the activity classifier 100. The processor 204 performs one or multiple operations based on an operating system and/or various applications or computer programs (e.g., software). The processor 204 accesses instructions from the memory 206, from other components of the device 200, and/or from a source external to the device 200 (e.g., a network, another device, etc.). The processor 204 may perform an operation and/or a process based on various techniques including, for example, multithreading, parallel processing, pipelining, interleaving, etc.

In some embodiments, the memory 206 includes one or multiple memories and/or one or multiple other types of storage mediums. For example, the memory 206 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 206 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 206 may include drives for reading from and writing to the storage medium. The memory 206 may be external to and/or removable from the device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 206 may store data, software, and/or instructions related to the operation of the activity classifier 100.

The communication interface 212 permits the device 200 to communicate with other devices, networks, systems, sensors, and/or the like on a network. The communication interface 212 may include one or multiple wireless interfaces and/or wired interfaces. For example, the communication interface 212 may include one or multiple transmitters and receivers, or transceivers. The communication interface 212 may operate according to a protocol stack and a communication standard. In some embodiments, the communication interface 212 includes an antenna. The communication interface 212 may include various processing logic or circuitry (e.g., multiplexing/de-multiplexing, filtering, amplifying, converting, error correction, etc.). In some embodiments, the communication interface 212 operates using a long range wireless protocol, such as a cellular protocol or a WiFi protocol, a short range protocol, such as BLUETOOTH™, or a wired protocol, such as Ethernet.

In some embodiments, the input device 208 permits an input into the device 200. For example, the input device 208 may comprise a keyboard, a mouse, a display, a touchscreen, a touchless screen, a button, a switch, an input port, speech recognition logic, and/or some other type of suitable visual, auditory, or tactile input component. The output device 210 permits an output from the device 200. For example, the output device 210 may include a speaker, a display, a touchscreen, a touchless screen, a projected display, a light, an output port, and/or some other type of suitable visual, auditory, or tactile output component.

In some embodiments, the activity classification generated by the activity classifier 100 is used to change an operating parameter of the device 200. For example, if the device is provided in a smartphone, the operating parameter may be a mode of the device 200, such as a driving mode, a walking mode, a jogging mode, or some other mode. In one example, if the device 200 is changed to a driving mode based on the activity classification, incoming messages from the communication interface 212 may be suppressed or voiced to the user using a hands free mode of operation. In a jogging mode, a fitness software application may be launched by the device to track the activity. For a facility automation system, the operating parameters may be a state of a device such as a heating, ventilation, and air conditioning (HVAC) system. In some embodiments, changing the operating parameter includes entering an alert state, where the device 200 sends an alert message to a preconfigured other party indicating a safety issue, such as a fall.

Figure 3:
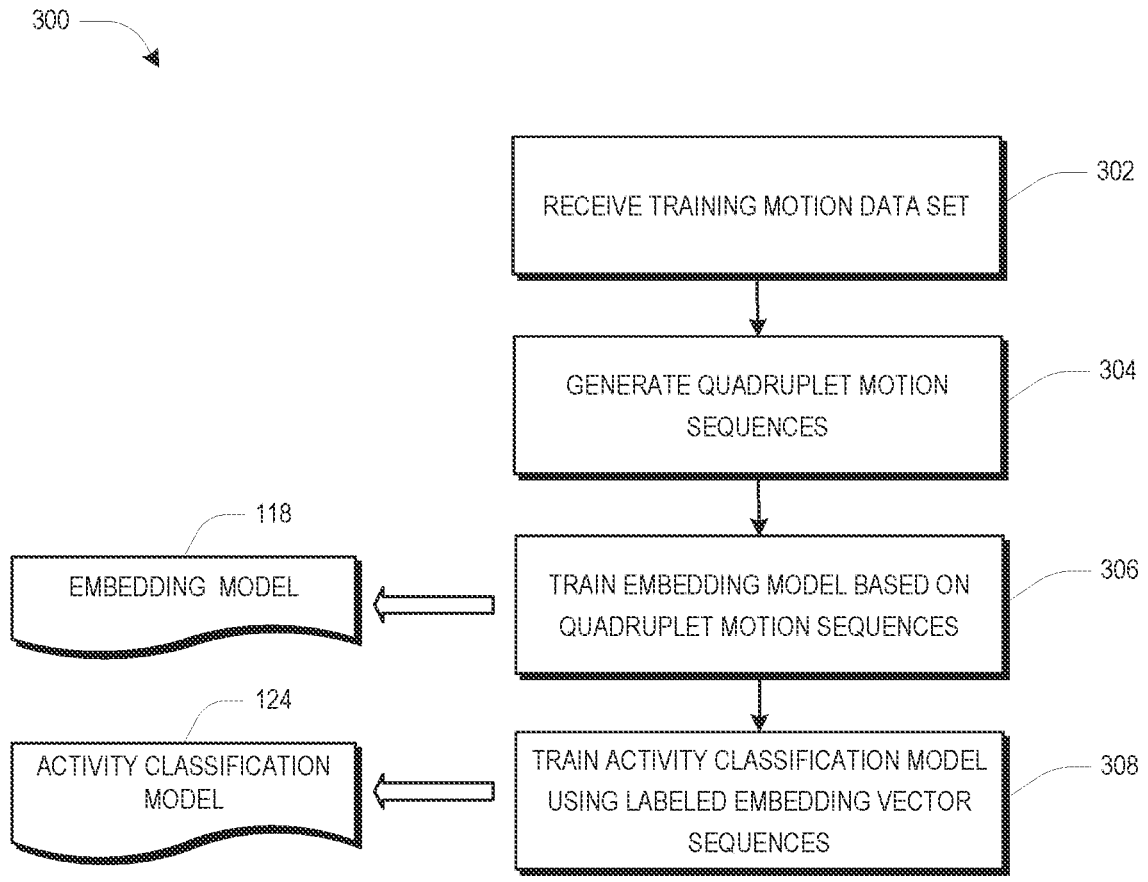
FIG. 3 is a flow chart illustrating an example method for training an embedding model and an activity classification model, in accordance with some embodiments.

FIG. 3 is a flow chart illustrating an example method 300 for training the embedding model 118 and the activity classification model 124. The method 300 may be performed by the device 200 or by a different computing device. At 302, a training motion data set is received. In some embodiments, the training motion data set comprises motion data, such as at least one of accelerometer data, gyroscope data, or magnetometer data for various activities, such as walking, jumping, running, jogging, driving, falling, executing a gesture, gaming, engaging in a sports activity (e.g., swimming, golfing, etc.), or some other activity. At 304, quadruplet motion sequences are generated, where each training set includes a first motion data time series for an anchor class representing the activity being trained, a second motion data time series representing another input example belonging to same class (positive class), a third motion data time series represents a sample from a first different class (negative$_1$ class), and a forth motion data time series represents a sample from a second different class (negative₂ class). For example, for a walking activity, the first two motion data time series represent data for a known walking activity, the third motion data time series represents data for a different activity, such as jumping, and the fourth motion data time series represents data for another different activity, such as standing. At 306, the embedding model 118 is trained based on the quadruplet motion sequences. A given anchor data set may be used with different negative classes for separate training iterations. At 308, the activity classification model 124 is trained using labeled embedding vector sequences. For example, a sequence of embedding vectors for known activities are provided for the activity classification model 124.

Figure 4:
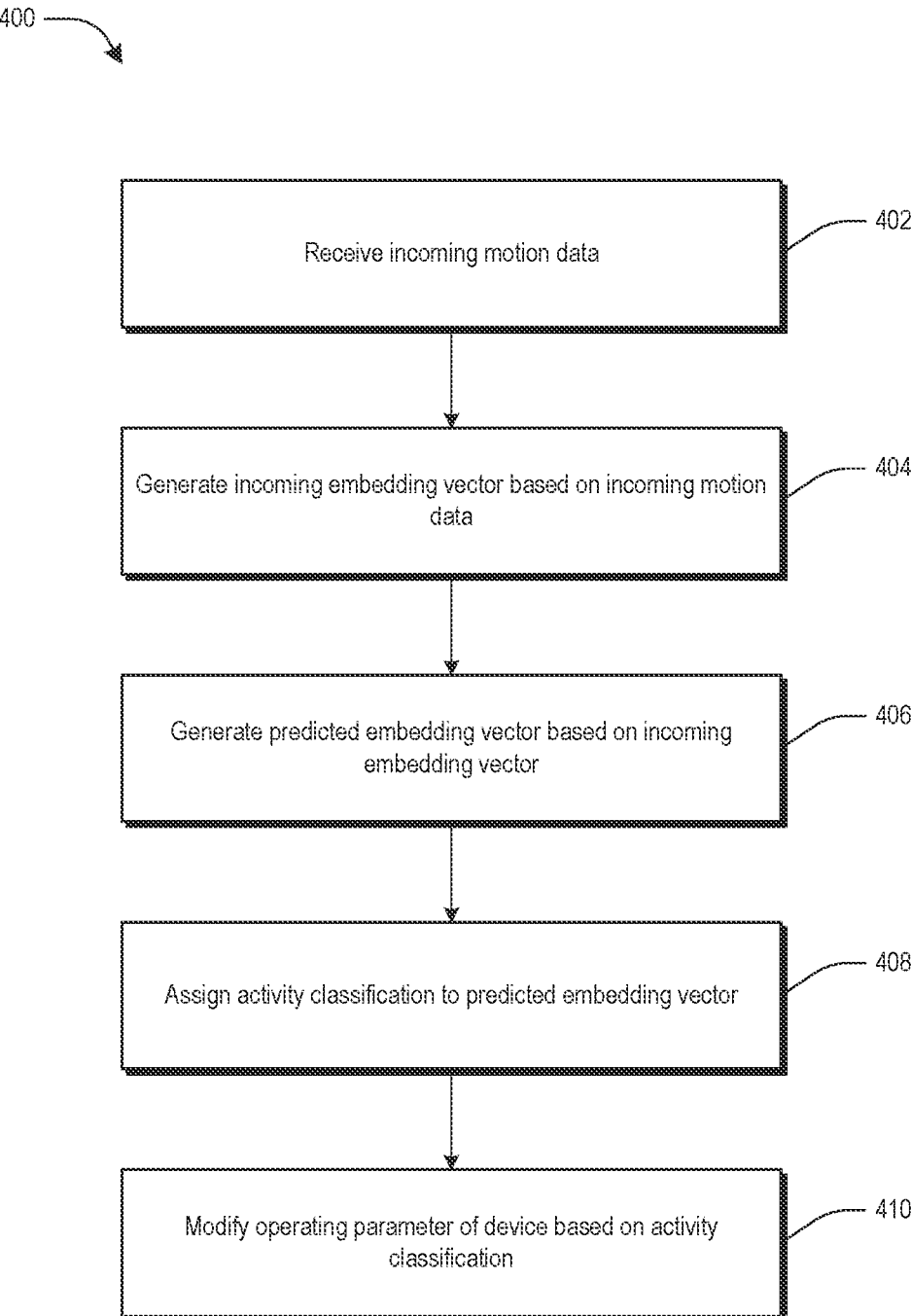
FIG. 4 is a diagram illustrating a method for classifying activities, in accordance with some embodiments.

FIG. 4 is a flow chart illustrating an example method 400 for activity classification. At 402, incoming motion data is received. At 404, an incoming embedding vector is generated based on the incoming motion data, for example, using the embedding model 118. In some embodiments, the embedding model 118 is trained using a quadruplet loss learning technique to learn to project the incoming motion data time series into embedding vectors. At 406, a predicted embedding vector is generated based on the incoming embedding vector. At 408, an activity classification is assigned to the predicted embedding vector using an activity classification model 124. At 410, an operating parameter of a device, such as the device 200, is modified based on the activity classification.

Figure 5:
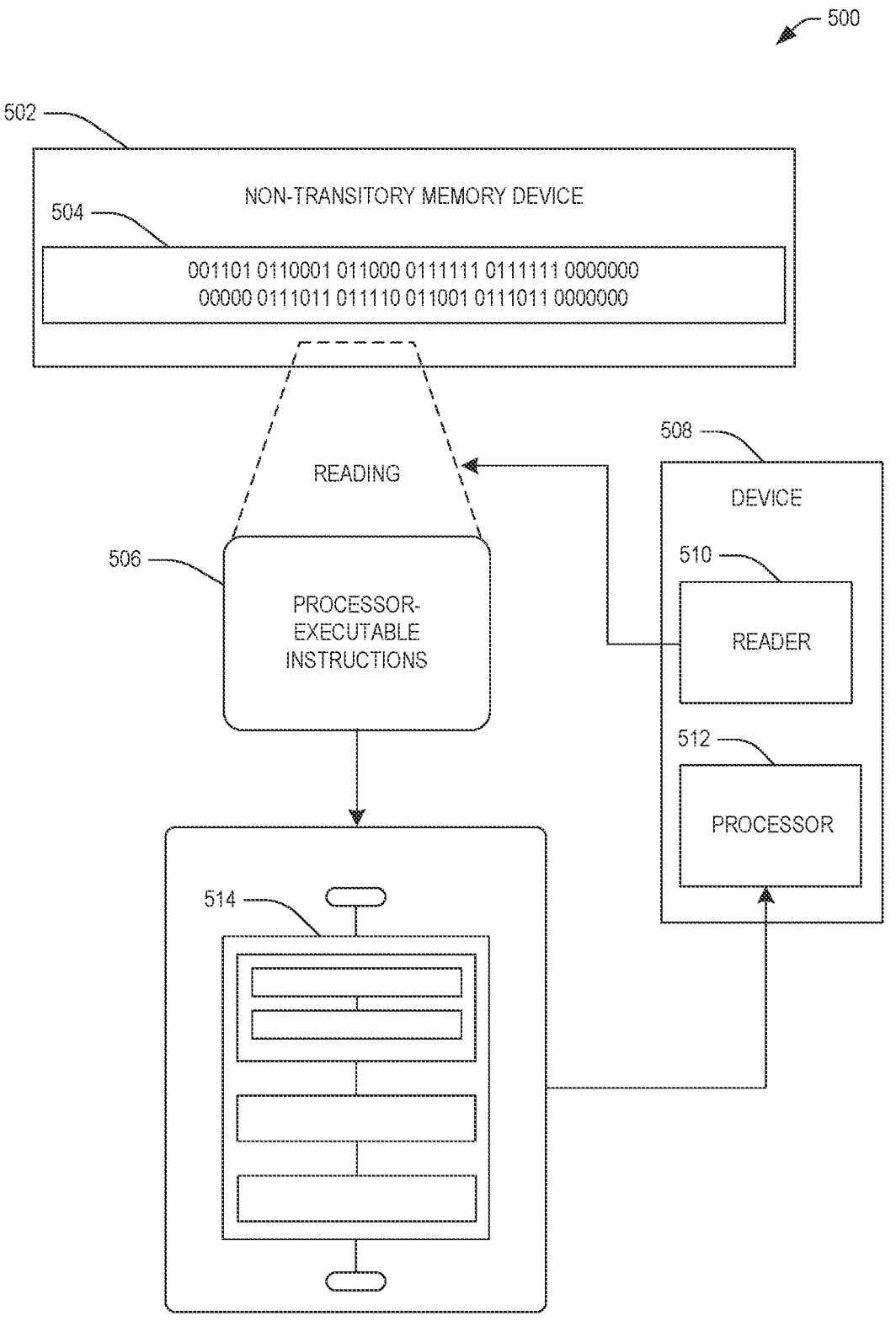
FIG. 5 illustrates an exemplary embodiment of a computer-readable medium, in accordance with some embodiments.

FIG. 5 illustrates an exemplary embodiment 500 of a computer-readable medium 502, in accordance with some embodiments. One or more embodiments involve a computer-readable medium comprising processor-executable instructions configured to implement one or more of the techniques presented herein. The embodiment 500 comprises a non-transitory computer-readable medium 502 (e.g., a CD-R, DVD-R, flash drive, a platter of a hard disk drive, etc.), on which is encoded computer-readable data 504. This computer-readable data 504 in turn comprises a set of processor-executable computer instructions 506 that, when executed by a computing device 508 including a reader 510 for reading the processor-executable computer instructions 506 and a processor 512 for executing the processor-executable computer instructions 506, are configured to facilitate operations according to one or more of the principles set forth herein. In some embodiments, the processor-executable computer instructions 506, when executed, are configured to facilitate performance of a method 514, such as at least some of the aforementioned method(s). In some embodiments, the processor-executable computer instructions 506, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, a method is provided. The method comprises receiving, by a device, incoming motion data from a motion sensor, generating, by the device, an incoming embedding vector based on the incoming motion data, generating, by the device, a predicted embedding vector based on the incoming embedding vector, assigning, by the device, an activity classification based on the predicted embedding vector, and modifying an operating parameter of the device based on the activity classification.

In an embodiment of the techniques presented herein, the method comprises filtering the incoming motion data to generate filtered motion data, sampling the filtered motion data into a window of predetermined length, and generating the incoming embedding vector based on the window.

In an embodiment of the techniques presented herein, the method comprises rejecting the incoming embedding vector based on a distance between the incoming embedding vector and a previous value of the predicted embedding vector.

In an embodiment of the techniques presented herein, generating the incoming embedding vector comprises generating the incoming embedding vector using an embedding model that generates a mean component of the incoming embedding vector and a variance component of the incoming embedding vector.

In an embodiment of the techniques presented herein, generating the incoming embedding vector comprises training an embedding model using a quadruplet loss technique, and generating the incoming embedding vector using the embedding model.

In an embodiment of the techniques presented herein, generating the predicted embedding vector comprises generating the predicted embedding vector using a Kalman filter.

In an embodiment of the techniques presented herein, assigning the activity classification comprises assigning the activity classification using a k-nearest neighbor model.

In an embodiment of the techniques presented herein, receiving the incoming motion data comprises receiving at least one of accelerometer data, gyroscope data, or magnetometer data.

In an embodiment of the techniques presented herein, a device is provided. The device comprises a motion sensor configured to generate incoming motion data, and a processor configured to execute instructions to facilitate performance of operations comprising generating an incoming embedding vector based on the incoming motion data, generating a predicted embedding vector based on the incoming embedding vector, assigning an activity classification based on the predicted embedding vector, and modifying an operating parameter of the device based on the activity classification.

In an embodiment of the techniques presented herein, the operations comprise filtering the incoming motion data to generate filtered motion data, sampling the filtered motion data into a window of predetermined length, and generating the incoming embedding vector based on the window.

In an embodiment of the techniques presented herein, the operations comprise rejecting the incoming embedding vector based on a distance between the incoming embedding vector and a previous value of the predicted embedding vector.

In an embodiment of the techniques presented herein, the operations for generating the incoming embedding vector comprise operations for generating the incoming embedding vector using an embedding model that generates a mean component of the incoming embedding vector and a variance component of the incoming embedding vector.

In an embodiment of the techniques presented herein, operations for training an embedding model using a quadruplet loss technique, and generating the incoming embedding vector using the embedding model.

In an embodiment of the techniques presented herein, the operations for generating the predicted embedding vector comprise operations for generating the predicted embedding vector using a Kalman filter.

In an embodiment of the techniques presented herein, the operations for assigning the activity classification comprise operations for assigning the activity classification using a k-nearest neighbor model.

In an embodiment of the techniques presented herein, the motion sensor comprises at least one of an accelerometer data, a gyroscope, or a magnetometer.

In an embodiment of the techniques presented herein, a non-transitory computer-readable medium is provided. The non-transitory computer-readable medium stores instructions that when executed facilitate performance of operations comprising receiving incoming motion data from a motion sensor, generating an incoming embedding vector based on the incoming motion data, generating a predicted embedding vector based on the incoming embedding vector, assigning an activity classification based on the predicted embedding vector, and modifying an operating parameter of a device based on the activity classification.

In an embodiment of the techniques presented herein, the operations comprise rejecting the incoming embedding vector based on a distance between the incoming embedding vector and a previous value of the predicted embedding vector.

In an embodiment of the techniques presented herein, the operations for generating the incoming embedding vector comprise operations for generating the incoming embedding vector using an embedding model that generates a mean component of the incoming embedding vector and a variance component of the incoming embedding vector.

In an embodiment of the techniques presented herein, the operations comprise training an embedding model using a quadruplet loss technique, and generating the incoming embedding vector using the embedding model.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
receiving, by a device, incoming 3-axis time series motion data from a motion sensor;
projecting, by a processor in the device, the 3-axis time series motion data into an incoming embedding vector using an embedding model;
generating, by the processor in the device, a predicted embedding vector based on the incoming embedding vector and using a Kalman filter;
assigning, by the processor in the device, an activity classification based on the predicted embedding vector; and
modifying, by the processor in the device, an operating parameter of the device based on the activity classification.

2. The method of claim 1, comprising:
filtering the incoming 3-axis time series motion data to generate filtered 3-axis time series motion data;
sampling the filtered 3-axis time series motion data into a window of predetermined length; and
generating the incoming embedding vector based on the window.

3. The method of claim 1, comprising:
rejecting the incoming embedding vector based on a distance between the incoming embedding vector and a previous value of the predicted embedding vector.

4. The method of claim 1, wherein projecting, by the processor in the device, the 3-axis time series motion data into the incoming embedding vector using the embedding model comprises:
generating using the embedding model a mean component of the incoming embedding vector and a variance component of the incoming embedding vector.

5. The method of claim 1, comprising:
training the embedding model using a quadruplet loss technique.

6. The method of claim 1, wherein assigning, by the processor in the device, the activity classification comprises:
assigning the activity classification using a k-nearest neighbor model.

7. The method of claim 1, wherein receiving the incoming 3-axis time series motion data comprises:

receiving at least one of accelerometer data, gyroscope data, or magnetometer data.

8. A device, comprising:

a motion sensor configured to generate incoming 3-axis time series motion data; and a processor configured to execute instructions to facilitate performance of operations comprising:

projecting the 3-axis time series motion data into an incoming embedding vector using an embedding model based on the incoming motion data;

generating a predicted embedding vector based on the incoming embedding vector and using a Kalman filter;

assigning an activity classification based on the predicted embedding vector; and modifying an operating parameter of the device based on the activity classification.

9. The device of claim 8, wherein the operations comprise:

filtering the incoming 3-axis time series motion data to generate filtered 3-axis time series motion data;

sampling the filtered 3-axis time series motion data into a window of predetermined length; and generating the incoming embedding vector based on the window.

10. The device of claim 8, wherein the operations comprise:

rejecting the incoming embedding vector based on a distance between the incoming embedding vector and a previous value of the predicted embedding vector.

11. The device of claim 8, wherein the operations for projecting the 3-axis time series motion data into the incoming embedding vector using the embedding model comprise operations for:

generating using the embedding model a mean component of the incoming embedding vector and a variance component of the incoming embedding vector.

12. The device of claim 8, wherein the operations comprise operations for:

training the embedding model using a quadruplet loss technique.

13. The device of claim 8, wherein the operations for assigning the activity classification comprise operations for:

assigning the activity classification using a k-nearest neighbor model.

14. The device of claim 8, wherein the motion sensor comprises at least one of an accelerometer data, a gyroscope, or a magnetometer.

15. A non-transitory computer-readable medium storing instructions that when executed facilitate performance of operations comprising:

receiving incoming motion data from a motion sensor;

projecting the 3-axis time series motion data into an incoming embedding vector using an embedding model based on the incoming motion data;

generating a predicted embedding vector based on the incoming embedding vector and using a Kalman filter;

assigning an activity classification based on the predicted embedding vector; and modifying an operating parameter of a device based on the activity classification.

16. The non-transitory computer-readable medium of claim 15, wherein the operations comprise:

rejecting the incoming embedding vector based on a distance between the incoming embedding vector and a previous value of the predicted embedding vector.

17. The non-transitory computer-readable medium of claim 15, wherein the operations for projecting the 3-axis time series motion data into the incoming embedding vector using the embedding comprise operations for:

generating using the embedding model a mean component of the incoming embedding vector and a variance component of the incoming embedding vector.

18. The non-transitory computer-readable medium of claim 15, wherein the operations comprise operations for:

training the embedding model using a quadruplet loss technique.

* * * * *